Figure 1:
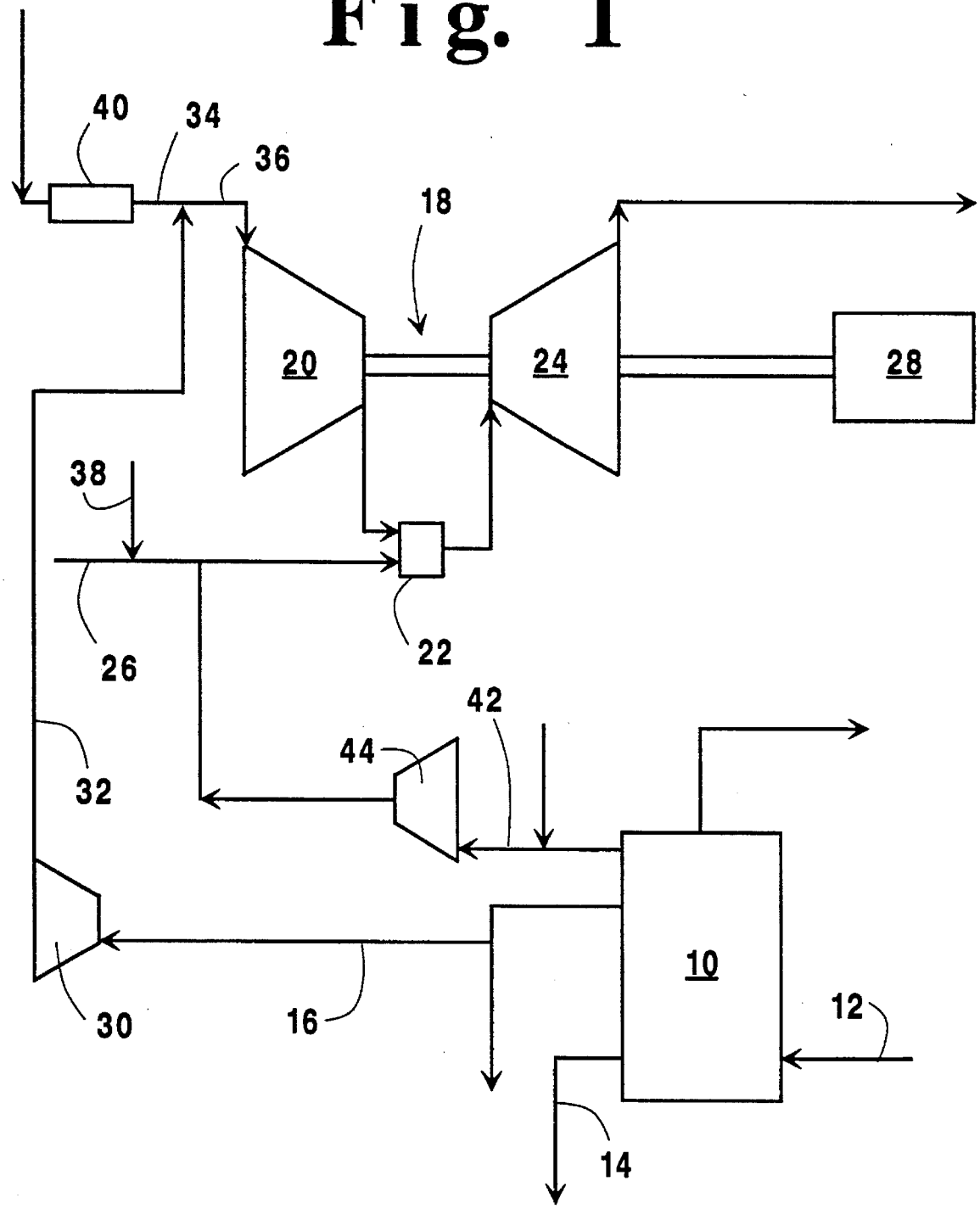

United States Patent [19]
Drnevich

[11] Patent Number: 5,459,994
[45] Date of Patent: Oct. 24, 1995

[54] GAS TURBINE-AIR SEPARATION PLANT COMBINATION

[75] Inventor: Raymond F. Drnevich, Clarence Center, N.Y.

[73] Assignee: Praxair Technology, Inc., Danbury, Conn.

[21] Appl. No.: 68,342

[22] Filed: May 28, 1993

[51] Int. Cl.[6] .................................................. F02G 3/00
[52] U.S. Cl. .......................... 60/39.02; 60/39.12; 60/39; 62/39
[58] Field of Search .................. 60/39.02, 39.12; 62/39

[56] References Cited

U.S. PATENT DOCUMENTS

| | | | |
|---|---|---|---|
| 3,950,957 | 4/1976 | Zakon | 62/30 |
| 4,019,314 | 4/1977 | Springmann | 60/39.12 |
| 4,297,842 | 11/1981 | Gerhold et al. | 60/39.06 |
| 4,313,300 | 2/1982 | Wilkes et al. | 60/39.02 |
| 4,486,209 | 12/1984 | Fabbri et al. | 62/39 |
| 4,608,818 | 9/1986 | Goebel et al. | 60/39.12 |
| 4,631,915 | 12/1986 | Frewer et al. | 60/39.12 |
| 4,651,519 | 3/1987 | Goebel et al. | 60/39.12 |
| 4,655,809 | 4/1987 | Shenoy | 62/39 |
| 4,729,217 | 3/1988 | Kehlhofer | 60/39.02 |
| 4,806,136 | 2/1989 | Kiersz et al. | 62/39 |
| 4,861,369 | 8/1989 | von Bogdandy et al. | 60/39.12 |
| 5,040,370 | 8/1991 | Rathbone | 60/648 |
| 5,076,837 | 12/1991 | Rathbone et al. | 75/433 |
| 5,081,845 | 1/1992 | Allam et al. | 62/24 |
| 5,231,837 | 8/1993 | Ha | 62/39 |
| 5,240,476 | 8/1993 | Hegarty | 60/39.02 |

FOREIGN PATENT DOCUMENTS 2067668  7/1981  United Kingdom .

*Primary Examiner*—Richard A. Bertsch
*Assistant Examiner*—Howard R. Richman
*Attorney, Agent, or Firm*—Peter Kent; Chung K. Pak

[57] ABSTRACT

A system and method of operating a system comprising an air separation plant and a gas turbine engine, the method comprising: providing a nitrogen-rich stream from the air separation plant; expanding and thereby cooling the nitrogen-rich stream; and delivering the expanded stream to the inlet of the compressor of the gas turbine engine to combine with the air stream entering the inlet of the compressor to form a total feed stream with reduced temperature and oxygen content so as to increase power output, increase efficiency and reduce NOx emissions of the gas turbine.

13 Claims, 2 Drawing Sheets

GAS TURBINE-AIR SEPARATION PLANT COMBINATION

BACKGROUND

Gas turbine engines are used as power plants in many industries, such as aviation, gas pipeline transmission, petroleum, steel, marine, and electric utilities. For many stationary and mobile applications, their characteristics have proved superior to those of competitive power plants. With ubiquitous use of gas turbine engines, even small increases in their efficiency and power output are highly desirable and needed. Accordingly, gas turbine engines have been combined with steam turbines in various ways in combined steam and gas plants.

To achieve increased efficiency, gas turbines engines have been used also in coal gasification plants, versions of which are basically comprised of an air separation unit and a coal gas production unit. In the air separation unit, an oxygen-enriched stream is produced. In the coal gas production unit, the oxygen-enriched stream is used to partially oxidize coal to generate a fuel gas. The fuel gas is used as fuel in a gas turbine engine. Even small further increases in efficiency and power output of such plants are highly desirable.

SUMMARY

This invention satisfies the above and other needs which will become apparent by providing a system advantageously combining a gas turbine engine and air separation plant. In one embodiment the system comprises:

(a) a gas turbine engine having a compressor and a combustor;

(b) an air separation plant capable of producing at least one nitrogen-rich fluid stream;

(c) an expander for expanding and thereby cooling at least a portion of the nitrogen-rich stream after withdrawal from the air separation plant; and (d) conduit for delivering the expanded portion of the nitrogen-rich stream from the expander to the inlet of the compressor of the gas turbine engine.

In another embodiment, the system further comprises a second compressor for compressing the nitrogen-rich stream after withdrawal from the air separation plant and cooling means for cooling the compressed nitrogen-steam prior to expansion in the expander.

The invention also provides a novel method of operating a system combining a gas turbine engine and air separation plant. The method comprises the steps of:

(a) producing at least one nitrogen-rich stream from the air separation plant;

(b) expanding at least a portion of the nitrogen-rich stream after withdrawal from the air separation plant; and (c) delivering the expanded portion of the nitrogen-rich stream to the inlet of the compressor of the gas turbine engine.

In another embodiment, the method further comprises compressing and cooling the portion of the nitrogen-rich stream after withdrawal from the air separation plant but prior to the expansion.

DRAWINGS

Figure 2:
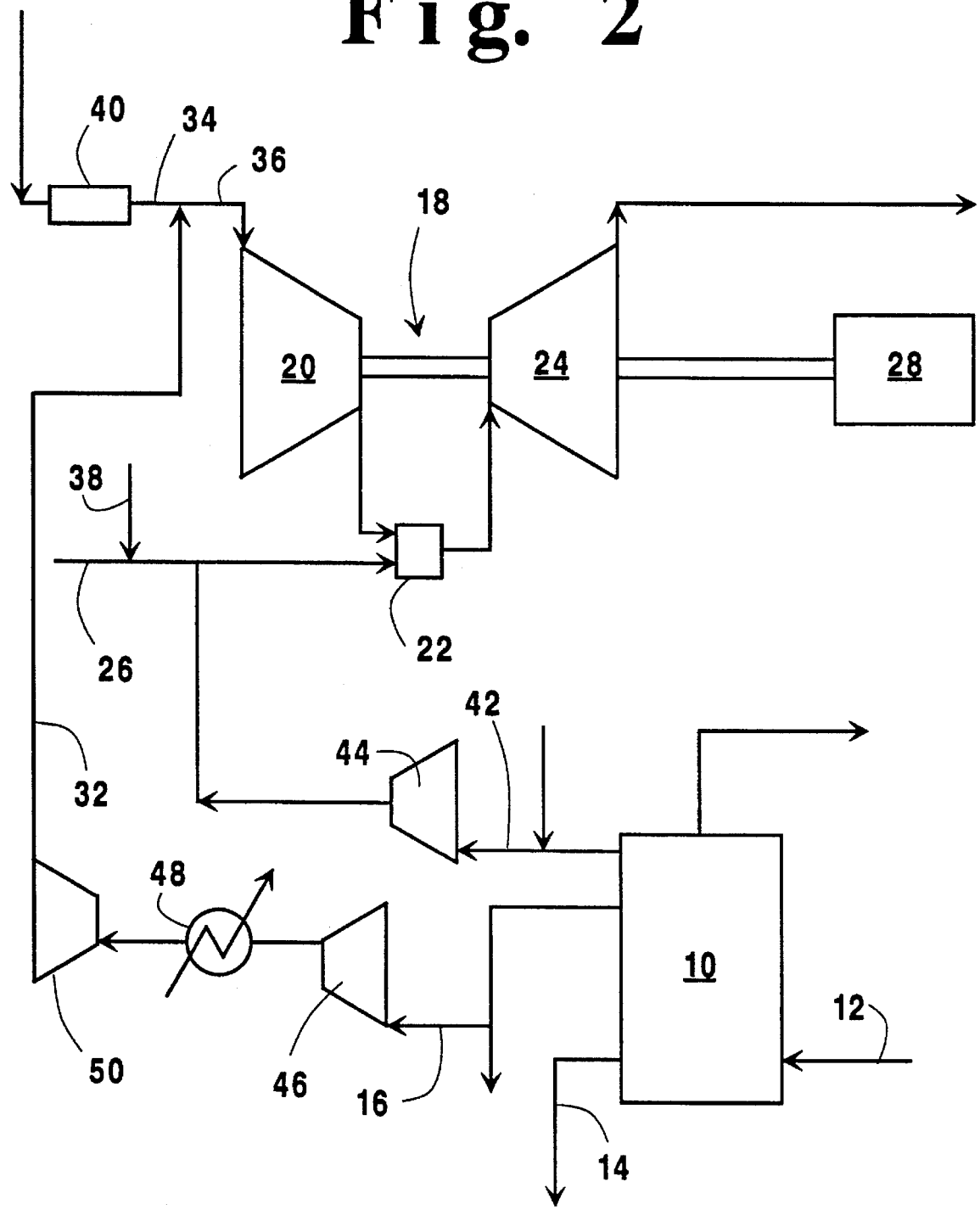

These and other features, aspects and advantages of the present invention will become better understood with regard to the following description, appended claims, and accompanying drawings where:

FIG. 1 is a flow diagram showing elements comprising an embodiment of the invention and the flow streams between the elements, and FIG. 2 is a flow diagram showing elements comprising another embodiment of the invention and the flow streams between the elements.

DESCRIPTION

Nitrogen-rich stream as used herein shall mean a stream having a nitrogen content greater than that of air, typically from 85 to 100% nitrogen by volume.

Oxygen-rich stream as used herein shall mean a stream having an oxygen content greater than that of air, typically from 80 to 100% oxygen by volume.

Air separation plant shall mean a plant capable of separating air into oxygen-rich and nitrogen-rich streams.

The invention is directed to a system combining a gas turbine engine and an air separation plant. FIG. 1 depicts an embodiment thereof. The system has an air separation plant 10 accepting an atmospheric air stream 12 and typically producing an oxygen-rich stream 14 or oxygen product stream and at least one nitrogen-rich stream 16. A nitrogen-rich stream is often a waste stream which conventionally is partly or entirely vented to the atmosphere.

The system also has a gas turbine engine 18 having a compressor 20 with an inlet and outlet, a combustor 22 with an inlet and outlet, and a turbine 24 with an inlet and outlet. The compressor inlet receives air, the compressor outlet is connected to the combustor inlet, the combustor outlet is connected to the turbine inlet, and the turbine outlet discharges to a low pressure sink such as the atmosphere. A fuel stream 26 enters the combustor 22 where it is combusted with the compressed air. The resultant hot gas stream is expanded nearly to ambient pressure in the turbine. The power output of the gas turbine engine may be directed to a generator 28 for the generation of electrical power, which can be used in the air separation plant 10 or elsewhere. Optionally, shaft power may be transferred mechanically from the gas turbine engine 18 to the air separation plant 10.

An advantageous type of air separation plant for use in this invention is an elevated-pressure cryogenic air separation plant. A nitrogen-rich stream typically leaves such a plant at a composition of from about 85% to about 100% nitrogen by volume, a temperature near ambient, and a pressure of from about 200 to about 1000 kPa, most typically from about 415 to about 450 kPa. Such characteristics make the use of at least a portion of such a stream particularly attractive. In the embodiment depicted in FIG. 1, at least a portion of a nitrogen-rich stream 16 is expanded to near ambient pressure in an expander 30 thereby further reducing the temperature of the stream. Typically, when the ambient temperature is about 288 K and the nitrogen-rich stream is withdrawn from the air separation plant at 425 kPa, the expanded stream has a temperature of about 208 K; when the ambient temperature is about 305 K and the nitrogen-rich stream is withdrawn from the air separation plant at 425 kPa, the expanded stream has a temperature of about 220 K.

The expanded nitrogen-rich stream is delivered by a conduit 32 to the inlet of the compressor 20 of the gas turbine engine, and is combined with the air intake stream 34 to the gas turbine engine to form the total feed flow 36 to the gas turbine engine compressor 20. The fraction of nitrogen-rich stream 16 which comprises the total feed flow 36 to the compressor 20 depends on several factors. The magnitude of the nitrogen-rich stream 16 is limited to the flow of nitrogen-rich stream available from the air separation plant 10. The fraction of nitrogen-rich stream must allow sufficient air in the total feed flow to provide sufficient oxygen in the total feed flow to sustain combustion in the combustor of the gas turbine engine. The fraction of the nitrogen-rich stream also must not be so great that the total feed flow temperature is reduced below the minimum temperature allowable in the gas turbine engine compressor inlet.

As a result of these factors, the fraction of nitrogen-rich stream comprising the total feed flow to the compressor ranges from about 2% to about 30% by volume, usually from about 5% to about 15%. With about typically 7.3% by volume of the gas turbine feed stream comprised of the nitrogen-rich stream, when the ambient temperature is about 288 K and the expanded nitrogen-rich stream is at about 208 K, the mixed feed stream has a temperature of about 280 K; and when the ambient temperature is about 305 K and the expanded nitrogen-rich stream is at about 220 K, the mixed feed stream has a temperature of about 300 K. Thus a considerable reduction in the temperature of the inlet feed stream to the gas turbine engine is accomplished with a resultant increase in the intake air capacity, efficiency and power output of the gas turbine engine and the system. Increases are achieved of up to 10% in the intake air capacity, up to 4% in the efficiency of the system, and up to 10% net power output of the system, where the system comprises the combined gas turbine and air separation plant. These improvements are relative to a similar system using nitrogen addition to the gas turbine engine combustor for NOx control, where NOx level in the emission from the engine in both cases is less than 25 ppm.

Another benefit realized from the addition of a nitrogen-rich stream to the gas turbine compressor inlet is a reduction in the NOx emissions of the gas turbine. The reduced oxygen content of the combustion air lowers the peak combustion temperature, and thereby decreases the formation of NOx.

Optionally, to reduce the NOx emissions of the gas turbine engine, a water stream 38 is added to the combustor of the gas turbine engine, as steam, or as liquid which evaporates in the combustor. With water added to the combustor, the amount of nitrogen-rich flow required to be added to the compressor for optimum NOx reduction is reduced.

Optionally, a cooling means 40 such as a mechanical chiller or evaporative cooler is provided to prechill the air intake to the gas turbine engine compressor. Such prechilling supplements the effect of nitrogen-rich stream addition to the inlet of the gas turbine engine compressor in increasing the capacity of the gas turbine engine compressor, the power output of the gas turbine engine and the efficiency of the gas turbine engine cycle. Counterbalancing the advantages of prechilling is the cost of the required cooling means and the pressure drop induced in the air stream in traversing through the cooling means.

Optionally, also for the purpose of reducing the NOx emissions of the gas turbine engine, a second nitrogen-rich stream 42 is withdrawn from the air separation plant. The second nitrogen-rich stream 42 may be a portion of the aforementioned nitrogen-rich stream 16. At least a portion of the second nitrogen-rich stream is compressed in a compressor 44 to a pressure allowing it to be delivered by a conduit 32 to the inlet of the combustor of the gas turbine engine where the stream combines with the feed flow emerging from the gas turbine engine compressor. With a nitrogen-rich stream 42 added to the combustor, the amount of nitrogen-rich flow 16 added to the compressor for optimum NOx reduction is reduced.

In the prior art, reduction of NOx emissions from gas turbine engines in some instances, has been achieved entirely by admitting a large nitrogen-rich stream to the gas turbine engine combustor. Under such practice, a reduced mass flow is required at the gas turbine engine compressor inlet which is achieved by partially closing the guide vanes at the compressor inlet. With compressor inlet guide vanes partially closed, the efficiency of the gas turbine compressor and the overall efficiency of operation of the gas turbine engine is reduced. This disadvantage is obviated by the present invention wherein the nitrogen-rich stream added to the inlet of the compressor augments the inlet flow to the gas turbine engine compressor. Even in the case in this invention where a nitrogen-rich stream is optionally admitted to the inlet of the combustor to assist in reducing NOx emissions, the magnitude of such a stream to achieve optimum NOx reduction is small. Thus, a sufficiently large compressor inlet flow is maintained and it is unnecessary to close the compressor inlet guide vanes.

In another embodiment, depicted in FIG. 2, the system employs a low-pressure air separation plant 10 wherein nitrogen-rich streams discharge at near ambient pressure. A nitrogen-rich stream 16 to be added to the inlet of the gas turbine engine compressor 20 is compressed in a compressor 46 to a pressure from about 1.4 to about 14 times the ambient pressure. The compressed stream is then cooled preferably to near ambient temperature in a cooling means 48, typically against water or ambient air in a heat exchanger. The compressed and cooled stream is then expanded in an expander 50 to near atmospheric pressure. Other components of the embodiment of FIG. 2 are like those in the embodiment of FIG. 1 wherein like components are designated by like reference numerals.

Typically in the embodiment of FIG. 2, when the ambient temperature is about 288 K, the nitrogen-rich stream to be added to the compressor inlet is compressed to a pressure of 425 kPa and is then cooled to a temperature of 290 K in an aftercooler. The compressed and cooled stream is then expanded in an expander, typically to a pressure of about 104 kPa and a temperature of about 208 K. With about 7.3% of the gas turbine compressor feed stream comprised of the expanded nitrogen-rich stream, the mixed gas turbine feed compressor stream has a temperature of about 280 K. The resultant increase in intake air capacity is about 2.9%, the increase of the system efficiency is about 3%, and the net power output increase of the system is about 25%.

Typically, when the ambient temperature is about 305 K, the nitrogen-rich stream to be added to the compressor inlet is compressed to a pressure of 425 kPa and is cooled to a temperature of 308 K. The compressed and cooled stream is then expanded in an expander, typically to a pressure of about 104 kPa and a temperature of about 220 K. With about 7.3% of the gas turbine compressor feed stream comprised of the expanded nitrogen-rich stream, the mixed gas turbine feed compressor stream has a temperature of about 300 K. The resultant increase in intake air capacity is about 1.7%, the increase in the efficiency of the system is about 2.5%, and the increase in the net power output of the system is about 2%.

Although the invention has been described with respect to specific embodiments, it will be appreciated that it is intended to cover all modifications and equivalents within the scope of the appended claims.

What is claimed is:

1. A method of operating a system comprising a air separation plant and a gas turbine engine having a compressor and compressor inlet so as to increase power output and efficiency and reduce NOx emissions of the gas turbine engine, said method comprising:

(a) providing a nitrogen-rich stream from the air separation plan;

(b) expanding at least a portion of said nitrogen-rich stream with an expander turbine and thereby cooling said at least a portion of said nitrogen-rich stream; and (c) delivering the resulting cooled, expanded portion of said nitrogen-rich stream to the inlet of the compressor of said turbine engine.

2. The method as in claim 1 wherein said gas turbine engine further comprises a combustor with an inlet and said method further comprises:

(d) providing a second nitrogen-rich stream;

(e) compressing at least a portion of said second nitrogen-rich stream; and (f) delivering said portion of said second nitrogen-rich stream to the inlet of the combustor of said gas turbine.

3. The method as in claim 1 wherein said expanded portion of said nitrogen-rich stream delivered to the inlet of the compressor of said gas turbine engine comprises from about 2 to 30% of a total feed stream to said inlet of said compressor.

4. The method as in claim 1 wherein said expanded portion of said nitrogen-rich stream delivered to the inlet of the compressor of said gas turbine engine comprises from about 5 to 15% of a total feed stream to said inlet of said compressor.

5. The method as in claim 1 wherein said nitrogen-rich stream is withdrawn from the air separation plant at a pressure of from about 200 kPa to 1000 kPa.

6. The method as in claim 1 wherein said nitrogen-rich stream is withdrawn from the air separation plant at a pressure of from about 415 kPa to 450 kPa.

7. The method as in claim 1 further comprising delivering an air stream to said expanded portion of said nitrogen stream before said expanded portion of said nitrogen stream is delivered to the inlet of the compressor.

8. A method of operating a system comprising an air separation plant and a gas turbine engine having a compressor and compressor inlet so as to increase power output and efficiency and reduce NOx emissions of the gas turbine engine, said method comprising:

(a) providing a nitrogen-rich stream from the air separation plan;

(b) compressing and cooling at least a portion said nitrogen-rich stream;

(c) expanding and thereby cooling at least a portion of the compressed and cooled nitrogen-rich stream; and (d) delivering said expanded portion of said nitrogen-rich stream to the inlet of the compressor of said gas turbine engine.

9. A system combining a gas turbine engine and air separation plant, said system comprising:

(a) a gas turbine engine having a compressor with an inlet and outlet, a combustor with an inlet and outlet, and a turbine with an inlet and outlet, the compressor inlet for receiving air, the compressor outlet connected to the combustor inlet, the combustor outlet connected to the turbine inlet, and the turbine outlet discharging to a low pressure sink;

(b) an air separation plant capable of producing at least one nitrogen-rich fluid stream;

(c) an expander turbine for expanding and thereby cooling at least a portion of a first nitrogen-rich stream after withdrawal from said air separation plant; and (d) conduit for delivering said expanded portion of said first nitrogen-rich stream from said expander turbine to the inlet of said compressor of said gas turbine engine.

10. The system as in claim 9 further comprising a second compressor and cooling means for compressing and cooling at least a portion of said first nitrogen-rich stream after withdrawal from said air separation plant and prior to expansion in said expander turbine.

11. The system as in claim 9 further comprising a third compressor for compressing at least a portion of a second nitrogen-rich stream after withdrawal from said air separation plant; and a conduit for delivering said portion of said second nitrogen-rich stream to the inlet of said combustor of said gas turbine engine.

12. The system as in claim 9, wherein said expander turbine is directly in fluid communication with said air separation plant.

13. The system as in claim 9, further comprising an air source which is in fluid communication with said conduit.

\* \* \* \* \*